(12) United States Patent
Kuo et al.

(10) Patent No.: US 11,906,713 B2
(45) Date of Patent: Feb. 20, 2024

(54) OPTICAL FINGERPRINT SENSING MODULE AND DISPLAY DEVICE WITH OPTICAL FINGERPRINT DETECTION

(71) Applicant: NOVATEK Microelectronics Corp., Hsinchu (TW)

(72) Inventors: Feng-Jung Kuo, Hsinchu County (TW); Min Huang, Taoyuan (TW); Jung-Chung Lee, Taoyuan (TW); Chi-Ting Chen, Hsinchu (TW); Li-Yuan Chang, Yunlin County (TW); I-Hsiu Chen, Taipei (TW); Chin-Hui Huang, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 513 days.

(21) Appl. No.: 16/885,302

(22) Filed: May 28, 2020

(65) Prior Publication Data
US 2020/0292796 A1    Sep. 17, 2020

Related U.S. Application Data

(63) Continuation-in-part of application No. 16/742,932, filed on Jan. 15, 2020, now Pat. No. 11,294,152, (Continued)

(51) Int. Cl.
*G02B 13/14* (2006.01)
*G02B 6/00* (2006.01)
(Continued)

(52) U.S. Cl.
CPC ............... *G02B 13/14* (2013.01); *G02B 1/11* (2013.01); *G02B 5/005* (2013.01); *G02B 5/208* (2013.01);
(Continued)

(58) Field of Classification Search
CPC ........ G06V 40/00; G06V 40/10; G06V 40/12; G06V 40/13; G06V 40/1318;
(Continued)

(56) References Cited

U.S. PATENT DOCUMENTS 6,927,844 B2  8/2005 Higuchi et al.
8,204,284 B2  6/2012 Wu
(Continued)

FOREIGN PATENT DOCUMENTS

CN    201698455 U    1/2011
CN    103699884 A    4/2014
(Continued)

*Primary Examiner* — Derek S. Chapel
*Assistant Examiner* — Adam W Booher
(74) *Attorney, Agent, or Firm* — CKC & Partners Co., LLC (57) ABSTRACT

An optical fingerprint sensing module includes an image sensing device, a light source and a light shielding structure. The image sensing device is configured to sense light transmitted from a fingerprint of a finger on a display panel. The image sensing device includes a light sensing plane having a first geometric center. The light source includes a light emitting plane having a second geometric center. The first geometric center is separated from the second geometric center by a distance from 2 mm to 20 mm. The light shielding structure is disposed between the image sensing device and the light source. In examples, the optical fingerprint sensing module further includes a field angle controller to constrain light pass there through with a field angle of 5-60 degrees. A display device including an optical fingerprint sensing module is disclosed herein as well.

13 Claims, 12 Drawing Sheets

Related U.S. Application Data which is a continuation of application No. 15/293,295, filed on Oct. 14, 2016, now Pat. No. 10,539,765.

(60) Provisional application No. 62/898,557, filed on Sep. 11, 2019, provisional application No. 62/241,156, filed on Oct. 14, 2015.

(51) Int. Cl.
*G02B 1/11* (2015.01)
*G02B 5/20* (2006.01)
*G02B 7/02* (2021.01)
*G02B 5/00* (2006.01)
*F21V 8/00* (2006.01)

(52) U.S. Cl.
CPC ............... *G02B 6/00* (2013.01); *G02B 7/02* (2013.01); *G02B 6/0001* (2013.01)

(58) Field of Classification Search
CPC .......... G06V 40/1324; G06V 40/1341; G06V 10/00–147; G02K 9/00; G02B 7/02; G02B 6/00; G02B 6/0001; G02B 5/005; G02B 5/208; G02B 5/003; G02B 5/0242; G02B 1/11; G02B 13/14
See application file for complete search history.

(56) References Cited

U.S. PATENT DOCUMENTS

| | | | |
|---|---|---|---|
| 2008/0225297 A1 | 9/2008 | Hossu | |
| 2015/0077362 A1* | 3/2015 | Seo | G06F 3/04883 |
| | | | 345/173 |
| 2017/0185234 A1 | 6/2017 | Zhang | |
| 2020/0134283 A1* | 4/2020 | Qing | G06V 40/1318 |
| 2021/0142028 A1* | 5/2021 | Zhou | G02F 1/13338 |

FOREIGN PATENT DOCUMENTS

| | | | | |
|---|---|---|---|---|
| CN | 104580808 A | | 4/2015 | |
| IN | 104035620 A | | 9/2014 | |
| JP | 2001196644 A | * | 7/2001 | |
| TW | M401814 U1 | | 4/2011 | |
| WO | WO-0070547 A1 | * | 11/2000 | ......... G06K 9/00013 |

* cited by examiner

OPTICAL FINGERPRINT SENSING MODULE AND DISPLAY DEVICE WITH OPTICAL FINGERPRINT DETECTION

RELATED APPLICATIONS

The present application is a continuation in part of U.S. patent application Ser. No. 16/742,932, filed Jan. 15, 2020, which is a continuation application of U.S. patent application Ser. No. 15/293,295, filed Oct. 14, 2016, U.S. Pat. No. 10,539,765, which claims priority to U.S. Provisional Patent Application No. 62/241,156, filed Oct. 14, 2015, all of which are herein incorporated by reference. The present application claims priority to U.S. Provisional Patent Application No. 62/898,557, filed Sep. 11, 2019, which is incorporated by reference herein in its entirety.

BACKGROUND

Technical Field

The present disclosure relates to an optical fingerprint sensing module and a display device with optical fingerprint detection.

Description of Related Art

Accompanying with the development of portable devices such as smart phones and tablet computers, techniques of individual identification are highly demanded. Among individual identification techniques, the fingerprint identification technique is thought to be promising from the standpoints of cost, size and identification accuracy. In conventional smart phones, the fingerprint identification modules are equipped in the cell phones at a region out of the display panel. Recently, some smart phones equipped with OLED panels integrate fingerprint identification modules into the OLED panels in order to minimalize the frame size of the smart phones. However, this technique is not suitable for other types of display panels because the optical mechanism and the structures of the display panels are quite different. Therefore, there is a need for a fingerprint identification technique which is suitable for various display panels.

SUMMARY

On aspect of the present disclosure is to provide an optical fingerprint sensing module. The optical fingerprint sensing module includes an image sensing device, at least one light source and a light shielding structure. The image sensing device is configured to sense light transmitted from a fingerprint of a finger on a display panel. The image sensing device includes a light sensing plane having a first geometric center. The at least one light source is adjacent to the image sensing device. The light source includes a light emitting plane having a second geometric center, and the first geometric center is separated from the second geometric center by a distance ranged from 2 mm to 20 mm. The light shielding structure is disposed between the image sensing device and the light source.

According to some embodiments of the present disclosure, the optical fingerprint sensing module further includes a field angle controller cooperated with the light source such that light emitted from the light source or passing through the field angle controller has a field angle ranged from 5 degrees to 60 degrees.

According to some embodiments of the present disclosure, the field angle ranges from 15 degrees to 35 degrees.

According to some embodiments of the present disclosure, the field angle ranges from 20 degrees to 30 degrees.

According to some embodiments of the present disclosure, the field angle controller includes a top plate extending laterally from a top of the light shielding structure, and the top plate has an aperture aligned with the light emitting plane.

According to some embodiments of the present disclosure, the field angle controller further includes a wall extending downwards from the top plate, and the light source is positioned between the wall and the light shielding structure.

According to some embodiments of the present disclosure, the wall surrounds the light shielding structure and the light source.

According to some embodiments of the present disclosure, the field angle controller includes a lens disposed over the light emitting plane.

According to some embodiments of the present disclosure, the field angle has an axis that is substantially perpendicular to the light sensing plane.

According to some embodiments of the present disclosure, the distance ranges from 4 mm to 10 mm.

According to some embodiments of the present disclosure, the image sensing device has a bottom that is coplanar with a bottom of the light source.

According to some embodiments of the present disclosure, the light shielding structure surrounds the image sensing device.

According to some embodiments of the present disclosure, the light shielding structure has an opening exposing the image sensing device.

An optical fingerprint sensing module includes an image sensing device, a light shielding structure, at least one light source, and a field angle controller, according to yet various embodiments. The light shielding structure surrounds the image sensing device, and the light shielding structure has an opening exposing the image sensing device. The at least one light source is positioned out of the light shielding structure such that the light shielding structure is located between the light source and the image sensing device. The field angle controller is adjacent to the light source and cooperated with the light source such that light emitted from the light source or passing through the field angle controller has a field angle ranged from 5 degrees to 60 degrees.

According to some embodiments of the present disclosure, the image sensing device includes a light sensing plane having a first geometric center, and the light source includes a light emitting plane having a second geometric center. The first geometric center is separated from the second geometric center by a distance ranged from 2 mm to 20 mm.

According to some embodiments of the present disclosure, the field angle controller includes a top plate extending laterally from a top of the light shielding structure, and the top plate has an aperture aligned with the light emitting plane in a direction perpendicular to the light emitting plane.

According to some embodiments of the present disclosure, the field angle controller further includes a wall extending downwards from the top plate, in which the light source is positioned between the wall and the light shielding structure.

According to some embodiments of the present disclosure, the field angle ranges from 15 degrees to 35 degrees.

On aspect of the present disclosure is to provide a display device with optical fingerprint detection. The display device includes a display panel and the optical fingerprint sensing module according to any one of embodiments or examples of the present disclosure. The display panel has a display side and a backside opposite to the display side. The optical fingerprint sensing module is disposed at the backside of the display panel.

According to some embodiments of the present disclosure, the light emitting plane and the light sensing plane face the backside of the display panel.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Still further, when a number or a range of numbers is described with "about," "approximate," and the like, the term is intended to encompass numbers that are within a reasonable range including the number described, such as within +1-10% of the number described or other values as understood by person skilled in the art. For example, the term "about 5 nm" encompasses the dimension range from 4.5 nm to 5.5 nm.

According to one aspect of the present disclosure, an optical fingerprint sensing module is provided. The optical fingerprint sensing module is capable of detecting or sensing a fingerprint of a user's finger. In various embodiments, the optical fingerprint sensing module detects the light transmitted from the fingerprint of a finger on a display panel of an electronic device.

Figure 1:
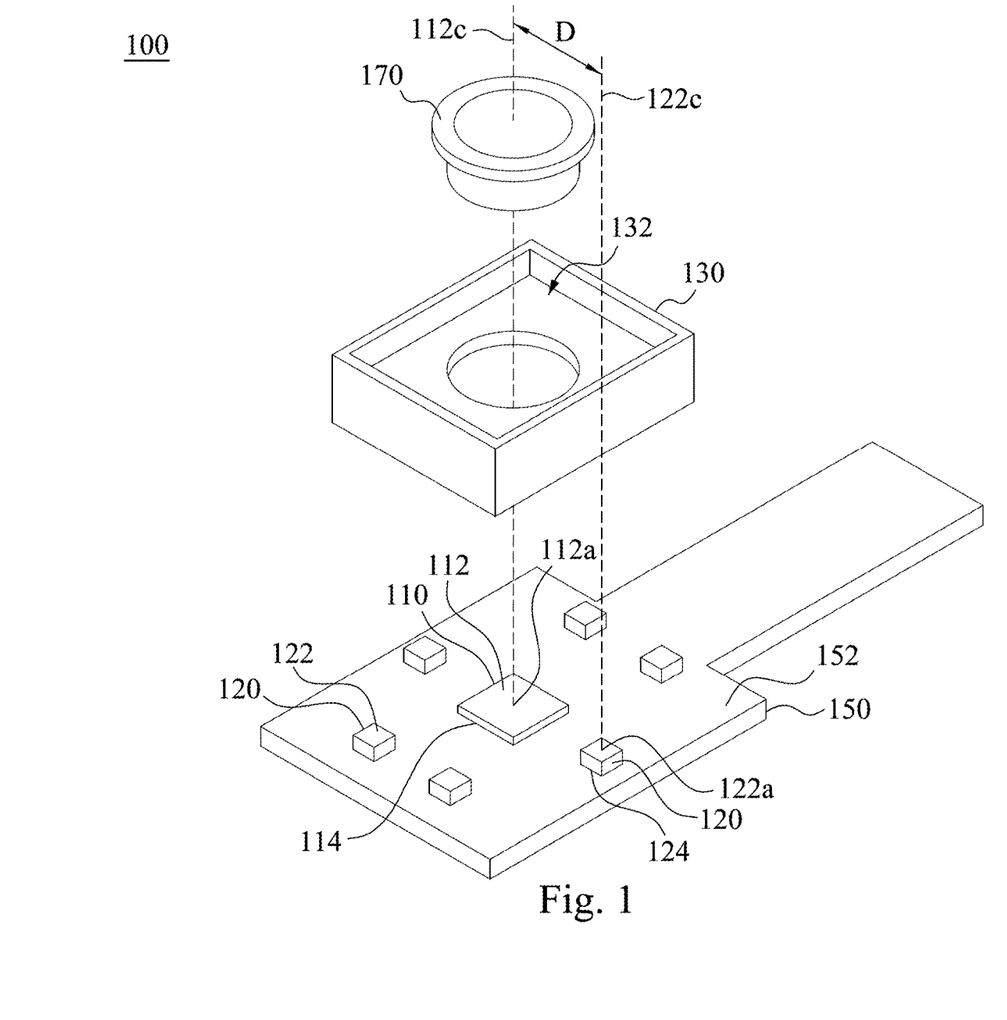
FIG. 1 is an exploded perspective view schematically illustrating an optical fingerprint sensing module according to some embodiments of the present disclosure.

FIG. 1 is an exploded perspective view schematically illustrating an optical fingerprint sensing module 100 according to some embodiments of the present disclosure. As shown in FIG. 1, the optical fingerprint sensing module 100 includes an image sensing device 110, one or more light sources 120, and a light shielding structure 130. The optical fingerprint sensing module 100 may optionally include other elements or features, which are described in detail hereinafter, according yet some embodiments of the present disclosure.

The image sensing device 110 includes a light sensing plane 112 which is capable of detecting or sensing incident light. For instance, the image sensing device 110 may include a number of light sensitive elements, called pixels, arranged on the light sensing plane 112. Photons incident onto the light sensing plane 112 generate charges that can be read and converted into digital signal. In some examples, the image sensing device 110 may include a charge coupled device (CCD) detecting infrared light or visible light, or a complementary metal-oxide-semiconductor (CMOS) device detecting infrared light or visible light. The light sensing plane 112 has a first geometric center 112a. The term "geometric center" herein refers to the general meaning in mathematics and physics, and particularly the "first geometric center" refers to the arithmetic mean position of all the points on the light sensing plane.

The one or more light sources 120 are arranged adjacent to the image sensing device 110. Although FIG. 1 depicts a plurality of light sources 120, the present disclosure is not limited thereto. In some embodiments, the image sensing device 110 may include a single light source 120. The light source(s) 120 is capable of emitting infrared light or visible light, depending on the types of the image sensing device 110. In some examples, the light source(s) 120 may be a visible light emitting diode when the image sensing device 110 includes a CCD or CMOS device detecting visible light. In yet some examples, the light source(s) 120 may be an infrared light emitting diode when the image sensing device 110 includes a CCD or CMOS device detecting infrared light.

The light source 120 may include a light emitting plane 122 having a second geometric center 122a. The term "light emitting plane" herein refers to the plane which emits light when observed in a top view of the light source 120. Furthermore, the term "geometric center" herein refers to the general meaning in mathematics and physics, and particularly the "second geometric center" refers to the arithmetic mean position of all the points on the light emitting plane. In some embodiments, the light source 120 includes an LED chip, and the second geometric center 122a of light emitting plane 122 is approximately the same as the geometric center of the top surface of LED chip.

The second geometric center 122a is separated or spaced apart from the first geometric center 112a by a distance D ranged from 2 mm to 20 mm. According to various embodiments, the distance D between the first and second geometric centers 112a, 122a is critical and that provides certain technical effects. In particular, when the distance D is less than a certain level such as 2 mm, the signal-to-noise ratio (SNR) of the detected fingerprint decreases to an unaccepted level, according to some embodiments. On the other hand, when the distance D is greater than another certain value such as 20 mm, the signal-to-noise ratio of the detected fingerprint also decreases to an unaccepted level, according to yet some embodiments. Therefore, a relatively better range of the distance D is present, and the range of the distance D is from 2 mm to 20 mm, specifically 4 mm to 10 mm. For instance, the distance D may be 2 mm, 4 mm, 6 mm, 8 mm, 10 mm, 12 mm, 14 mm, 16 mm, 18 mm, or 20 mm. The possible mechanism of the criticality of the distance D will be discussed in detail hereinafter.

In some embodiments, the light sensing plane 112 may be substantially parallel to the light emitting plane 122. The light emitting plane 122 may be higher or lower than the light sensing plane 112. Furthermore, the light sensing plane 112 has a first axis 112c perpendicular to the light sensing plane 112 and passing through the first geometric center 112a. The light emitting plane 122 has a second axis 122c perpendicular to the light emitting plane 122 and passing through the second geometric center 122a. The distance D between the first and second geometric centers 112a, 122a is defined as the distance between the first axis 112c and the second axis 122c.

Figure 2:
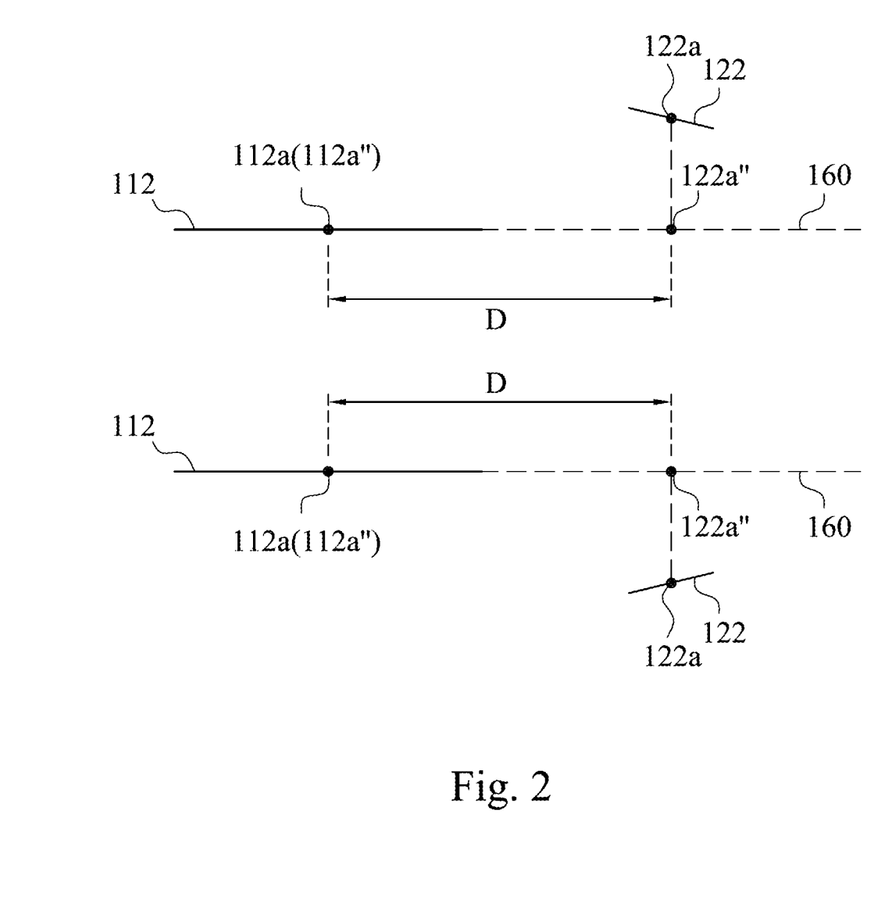
FIG. 2 is a diagram showing the distance between the first and second geometric centers according to some embodiments of the present disclosure.

In yet some embodiments, the light sensing plane 112 is not parallel to the light emitting plane 122, as shown in FIG. 2. The light emitting plane 122 may be higher or lower than the light sensing plane 112. The upper portion of FIG. 2 depicts that the light emitting plane 122 is higher than the light sensing plane 112. The lower portion of FIG. 2 depicts that the light emitting plane 122 is lower than the light sensing plane 112. FIG. 2 further depicts a virtual plane 160 that is parallel to the light sensing plane 112. In these embodiments, the distance D between the first and second geometric centers 112a, 122a is defined as the distance between the normal projection 112a" of the first geometric centers 112a and normal projection 122a" of the second geometric centers 122a onto the virtual plane 160.

Referring back to FIG. 1, according to some embodiments, the image sensing device 110 has a bottom 114 that is coplanar with a bottom 124 of the light source 120. For instance, the bottom 114 of the image sensing device 110 and the bottom 124 of the light source 120 may be attached or bonded onto a plane 152 of a substrate 150, such as for example a circuit board. However, in yet some embodiments, the bottom 114 of the image sensing device 110 and the bottom 124 of the light source 120 are not coplanar.

In yet some embodiments, the optical fingerprint sensing module 100 includes a plurality of the light sources 120, and the light sources 120 are symmetrically arranged with respect to the first geometric center 112a in a plane view. For example, one or more pairs of the light sources 120 may be disposed, in which the paired light sources 120 are positioned at opposite sides of the image sensing device 110. The paired light sources 12 are equidistant from the image sensing device 110.

The light shielding structure 130 is disposed between the image sensing device 110 and the light source 120. The light shielding structure 130 extends from a position lower than the light emitting plane 122 to a position higher than both of the light emitting plane 122 and the light sensing plane 112. In some embodiments, the light shielding structure 130 surrounds the image sensing device 110. Specifically, the light source(s) 120 may be positioned out of the light shielding structure 130 whereas the image sensing device 110 is positioned inside the light shielding structure 130. In this manner, the light shielding structure 130 prevents the light sensing plane 112 from the interference of the light directly emitted from the light source 120 as well as other noise light that is irrelevant to the target fingerprint. According to yet some embodiments, the light shielding structure 130 may have an opening 132 exposing the image sensing device 110. In examples, the opening 132 is overlapped and/or substantially aligned with the image sensing device 110. Accordingly, light may be transmitted through the opening 132 to the light sensing plane 112 of the image sensing device 110.

Although FIG. 1 depicts that the light shielding structure 130 surrounds the image sensing device 110, the present disclosure is not limited thereto. For example, the light shielding structure 130 may be a single "partition" or a plurality of discrete "partitions" stood in between the light source(s) 120 and the image sensing device 110. The partition(s) vertically extends upwards to a position higher than both of the light sensing plane 112 and the light emitting plane 122.

A lens set 170 may optionally be included in the optical fingerprint sensing module 100, according to some embodiments of the present disclosure. The lens set 170 is disposed over the image sensing device 110, and configured to generate an image of the fingerprint for the image sensing device 110. In some embodiments, the lens set 170 may include a biconvex lens, a convex-concave (positive meniscus) lens, a plano-convex lens, a plano-concave lens, or a combination thereof.

The optical fingerprint sensing module 100 may further include a filter (not shown in FIG. 1) which filters unnecessary light having interferential wavelengths. For example, when the image sensing device 110 serves to detect infrared light (and the light source 120 serves to emit infrared light), the filter functions to filter visible light and/or ultraviolet light. The filter may be disposed over the image sensing device 110 and cover the light sensing plane 112. In some example, the filter may be a coating layer formed on one or more lenses of the lens set 170.

Figure 3:
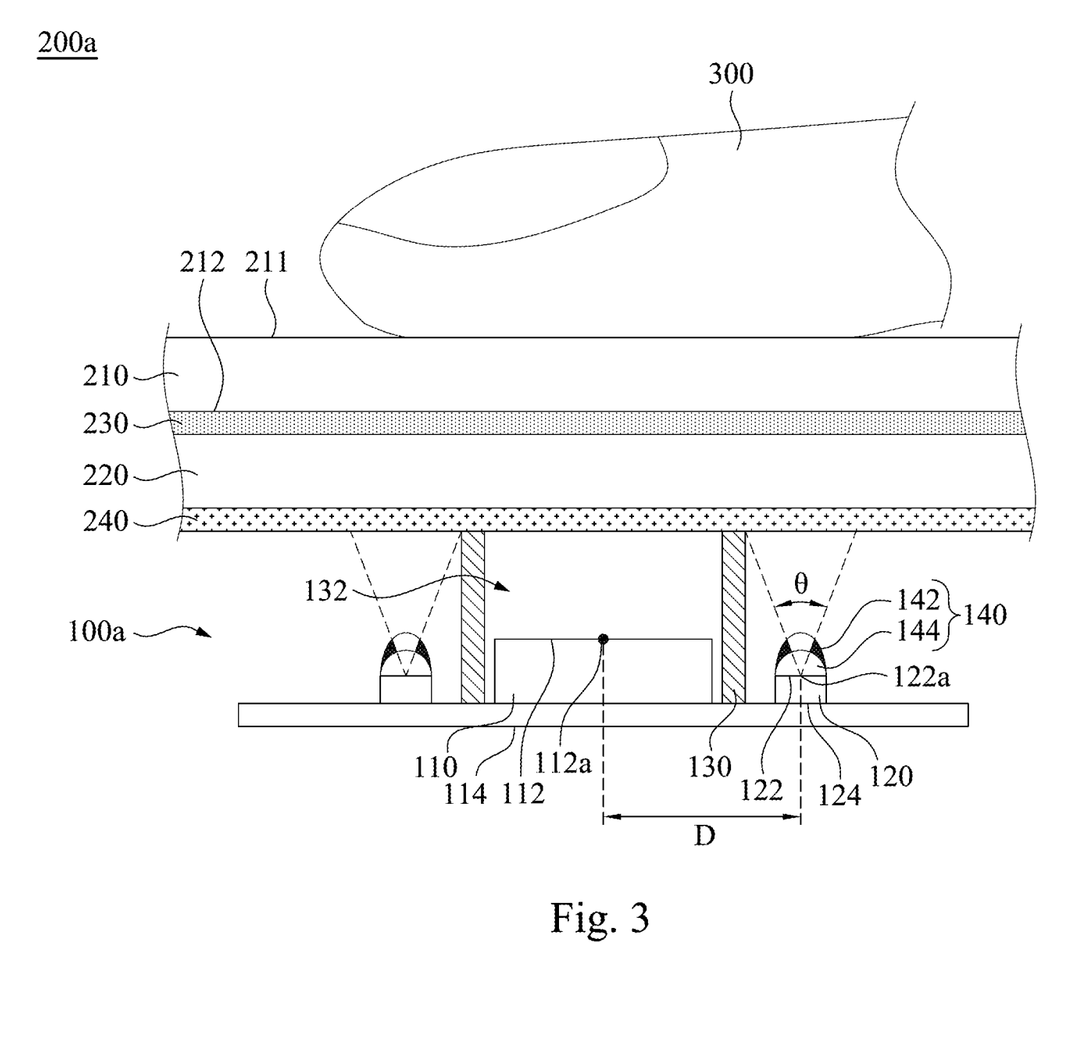
FIGS. 3-5 are cross-sectional views schematically illustrating display devices with optical fingerprint detection, according to some embodiments of the present disclosure.

FIG. 3 is a cross-sectional view schematically illustrating a display device 200a with optical fingerprint detection, according to some embodiments of the present disclosure. The display device 200a may be a part of an electronic device such as for example a smart phone, a tablet computer, a laptop, a communication device, an electronic security guarding device, or any device with requirement of fingerprint identification. As illustrated in FIG. 3, the display device 200a includes an optical fingerprint sensing module 100a and a display panel 210 over the optical fingerprint sensing module 100a. As to the optical fingerprint sensing module 100a, reference numerals are repeated herein to show the same or similar features shown in FIG. 1, and the description above applies equally to the embodiments described below, and the details thereof are not repeatedly described. The display panel 210 has a display side 211 and a backside 212 opposite to the display side 211. The optical fingerprint sensing module 100a can be disposed near the backside 212 of the display panel 210. The optical fingerprint sensing module 100a is configured to sense or detect light transmitted from fingerprint of the finger 300 on the display panel 210. In various embodiments, the light emitting plane 122 and the light sensing plane 112 face the backside 212 of the display panel 210.

The optical fingerprint sensing module 100a further includes a field angle controller 140, as compared to the embodiments shown in FIG. 1. The field angle controller 140 cooperates with the light source 120 such that light emitted from the light source 120 or the light passing through the field angle controller 140 has a field angle θ in a predetermined range, which can be preferably ranged from 5 degrees to 60 degrees. The field angle θ is critical in terms of the signal-to-noise ratio of the detected fingerprint. In particular, when the field angle θ is less than a certain level such as 5 degrees, the SNR of the detected fingerprint decreases to an unaccepted level, according to some embodiments. On other hand, when the field angle θ is greater than a certain value such as 60 degrees, the SNR of the detected fingerprint also decreases to an unaccepted level, according to yet some embodiments. Therefore, a relatively better range of the field angle θ is present between 5 to 60 degrees, specifically ranged from 15 degrees to 35 degrees, more specifically from 20 degrees to 30 degrees. For instance, the field angle θ may be 5 degrees, 10 degrees, 15 degrees, 20 degrees, 25 degrees, 30 degrees, 35 degrees, 40 degrees, 45 degrees, 50 degrees, 55 degrees or 60 degrees. The possible mechanism of the criticality of the field angle will be discussed in detail hereinafter. It is noted that when the field angle controller 140 is used and controls the field angle θ of the light in the range from 5 degrees to 60 degrees, the distance D between the first and second geometric center 112a, 122a is possible to be out of the range of 2 mm to 20 mm.

The field angle controller 140 may be disposed at any suitable position adjacent to the light source 120 as long as it can cooperate with the light source 120 to control the field angle of the light in a predetermined range, for example, the range from 5 degrees to 60 degrees. In some embodiments, the field angle controller 140 may include a lens 144 disposed over the light emitting plane 122. For example, the lens may be a plano-convex lens or positive meniscus lens, or the like. The plano-convex lens or positive meniscus lens focuses (or concentrate) the light emitted from the light source 120 to control the field angle of the light emitted from the light source 120. In yet some embodiments, the field angle controller 140 further includes a shielding dome 142 mounted on the lens 144. The shielding dome 142 functions to shield the light with a large angle with respect to the normal axis of the light emitting plane 122. In addition, the shielding dome 142 has an aperture that exposes the second geometric center 122a of the light source 120.

The light emitted from the light source 120 illuminates a finger 300, and the image sensing device 110 detects the light transmitted from the finger 300. Therefore, the fingerprint of the finger 300 may be detected.

In some embodiments, the display device 200a may optionally include a light guide plate 220, a diffuser 230, and a reflector 240. The light guide plate 220 is disposed between the display panel 210 and the optical fingerprint sensing module 100a. The diffusor 230 is disposed between the light guide plate 220 and the display panel 210. The reflector 240 is disposed between the light guide plate 220 and the optical fingerprint sensing module 100a.

In some embodiments, display panel 210 is a liquid crystal display (LCD) panel. In examples, the LCD panel may be an IPS LCD panel, a MVA LCD panel, a TN mode LCD panel, a semi-reflective LCD panel, or the like. As shown in FIG. 3, a plurality of optical elements is disposed between the finger 300 and the optical fingerprint sensing module 100a. The detection of the image of the fingerprint is more difficult than other kinds of display panels. Therefore, the aforementioned SNR is important for the purposes of precise detection of the fingerprint, and the aforementioned distance D and/or field angle θ are critical, according to some embodiments of the present disclosure.

Figure 4:
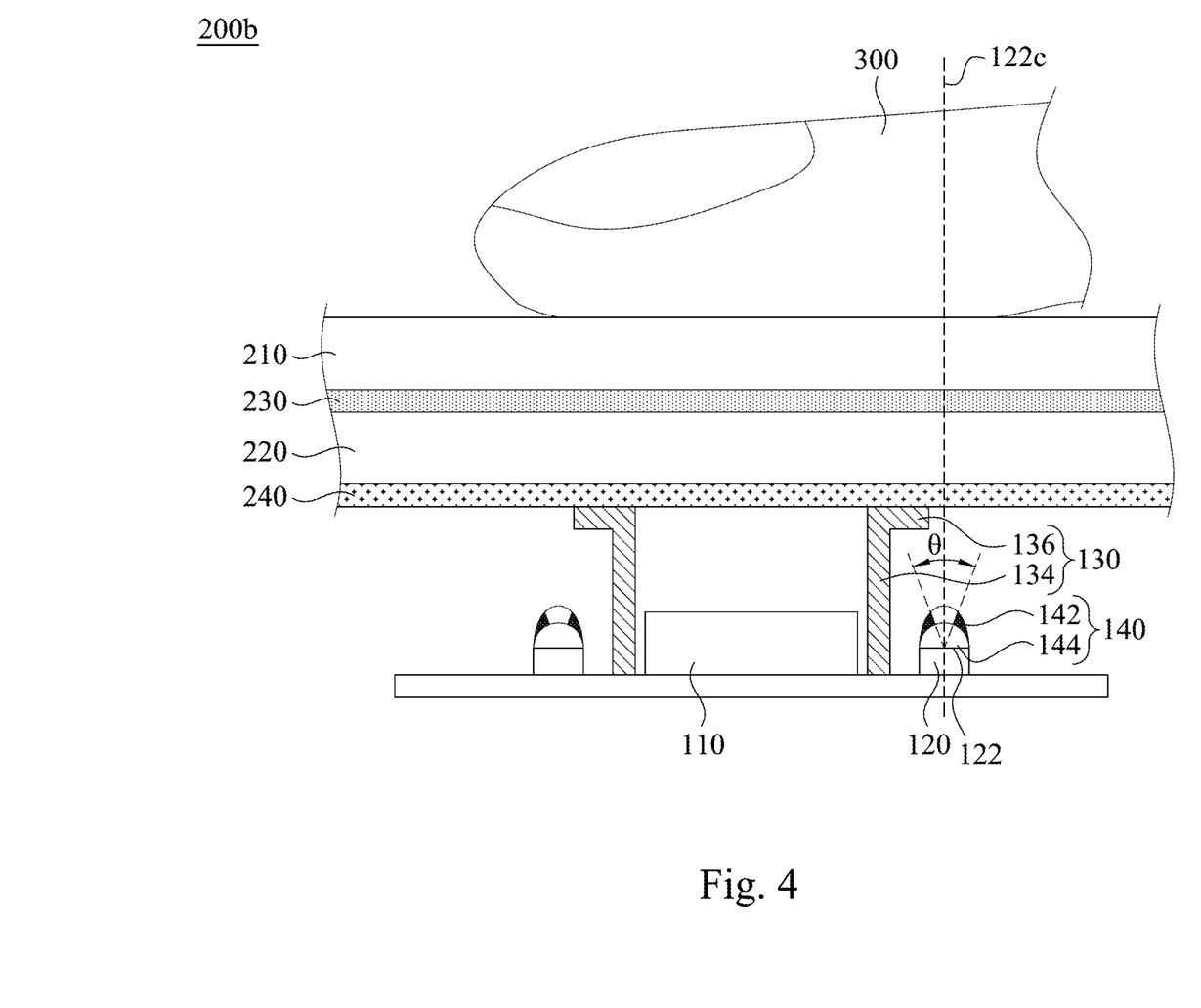

FIG. 4 is a cross-sectional view schematically illustrating a display device 200b with optical fingerprint detection, according to yet some embodiments of the present disclosure. The display device 200b is similar to the display device 200a shown in FIG. 3, except that the light shielding structure 130 includes a wall 134. In some embodiments, an eaves portion 136 can be further included. The eaves portion 136 can laterally extend from a top of the wall 134 towards the second axis 122c of the light source 120. In some embodiments, the eaves portion 136 laterally extends to a position not beyond the second axis 122c of the light emitting plane 122. The eaves portion 136 also assists to enhance the aforementioned SNR of the detected fingerprint.

Figure 5:
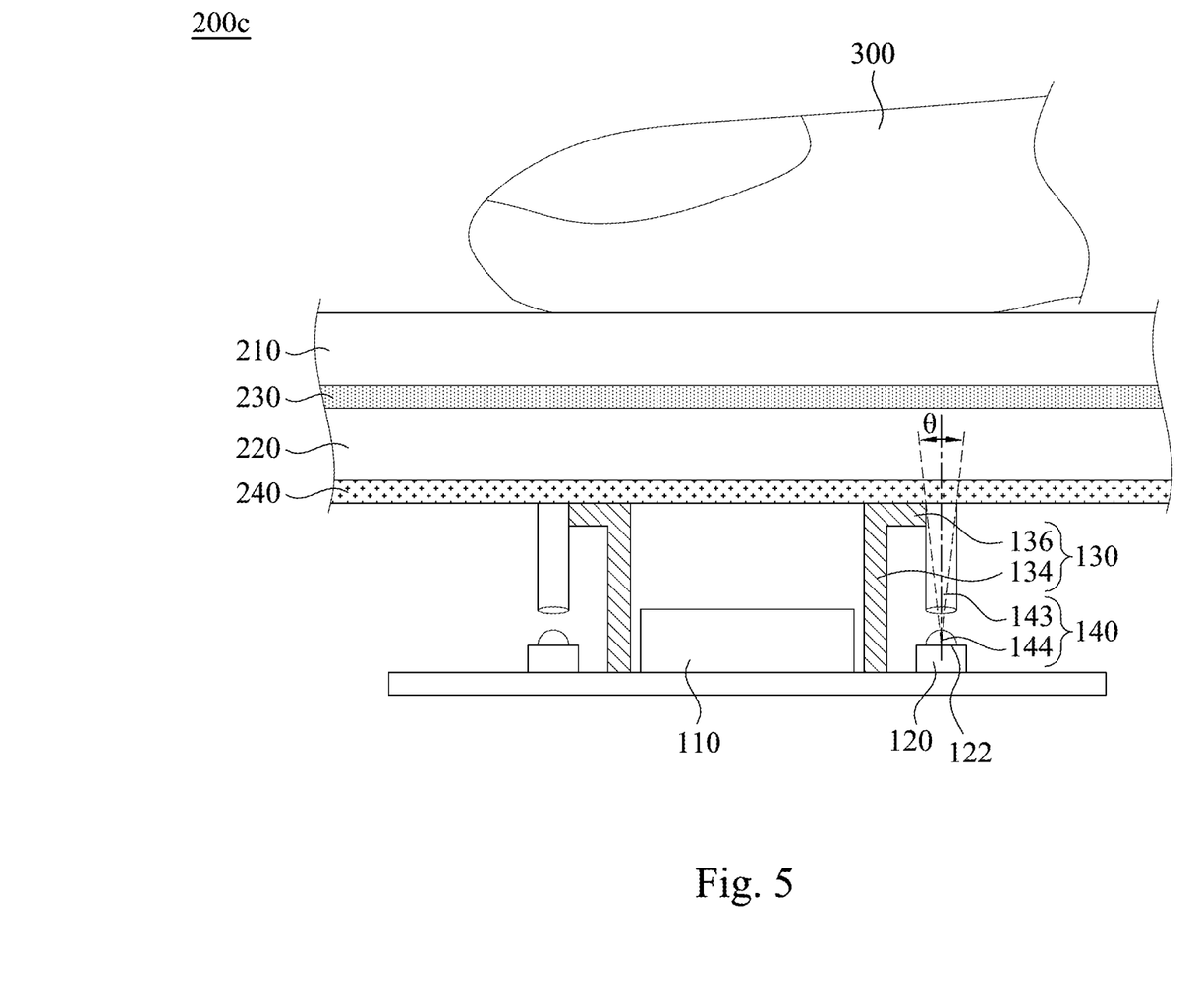

FIG. 5 is a cross-sectional view schematically illustrating a display device 200c with optical fingerprint detection, according to yet some embodiments of the present disclosure. The display device 200c is similar to the display device 200b shown in FIG. 4, except that the structure of the field angle controller 140 is different. In FIG. 5, the field angle controller 140 includes a collimator 143 and a lens 144. The collimator 143 and lens 144 collectively serves to manage the directions of the light so that the field angle of the light through the collimator 143 may be limited in a desired range. In some examples, the lens 144 is directly mounted on the light source 120, and the collimator 143 is fixed to the eaves portion 136. The collimator 143 is above the lens 144 and substantially aligned with the lens 144. In yet some examples, the collimator 143 may be directly placed on the lens 144, and is put around the lens 144.

Figure 6A:
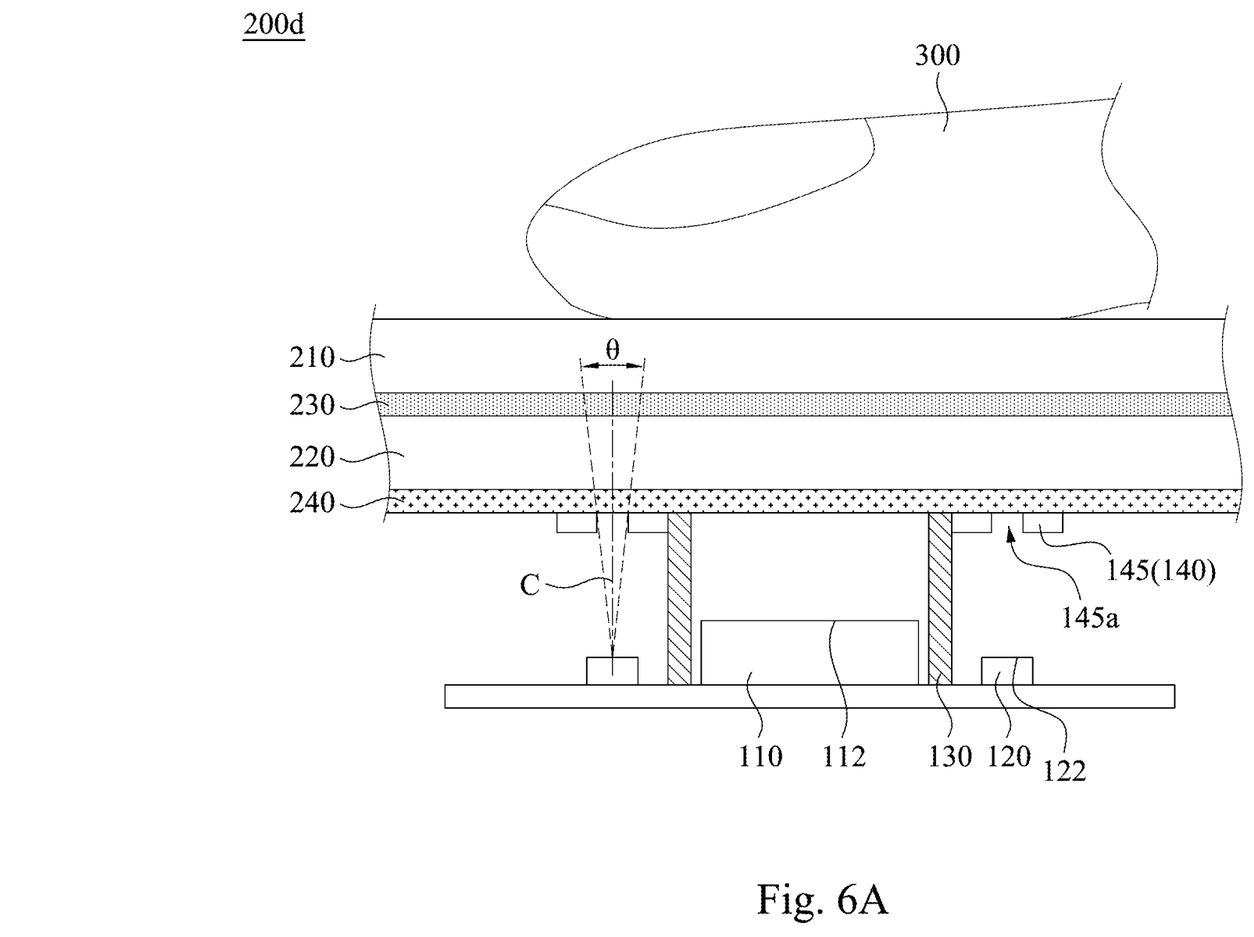
FIG. 6A is a cross-sectional view schematically illustrating a display device with optical fingerprint detection, according to yet some embodiments of the present disclosure.

FIG. 6A is a cross-sectional view schematically illustrating a display device 200d with optical fingerprint detection, according to yet some embodiments of the present disclosure. The display device 200d is similar to the display device 200a shown in FIG. 3, except that the structure of the field angle controller 140 is different. In FIG. 6A, the field angle controller 140 includes a top plate 145 extending laterally from a top of the light shielding structure 130. The top plate 145 has an aperture 145a aligned with the light emitting plane 122 in a direction perpendicular to the light emitting plane 122. In some examples, the aperture 145a has a width less than a width of the light emitting plane 122. Therefore, the light transmitted through the aperture 145a of the top plate 145 may be constrained within a certain field angle. However, in some examples, the width of the aperture 145a may be greater than the width of the light emitting plane 122. For example, another optical element (e.g., lens 144 shown in FIG. 5) may be disposed over the light emitting plane 122 of the light source 120 to facilitate constraining the field angle θ. The field angle θ of the light through the aperture 145a can be constrained in the range from 5 degrees to 60 degrees, and then the constrained light projects to the finger 300. The field angle θ has an axis C that directs to the finger 300 so that the image of the fingerprint may be detected by the image sensing device 110. In examples, the axis C is substantially perpendicular to the light emitting plane 122 and the light sensing plane 112.

Figure 6B:
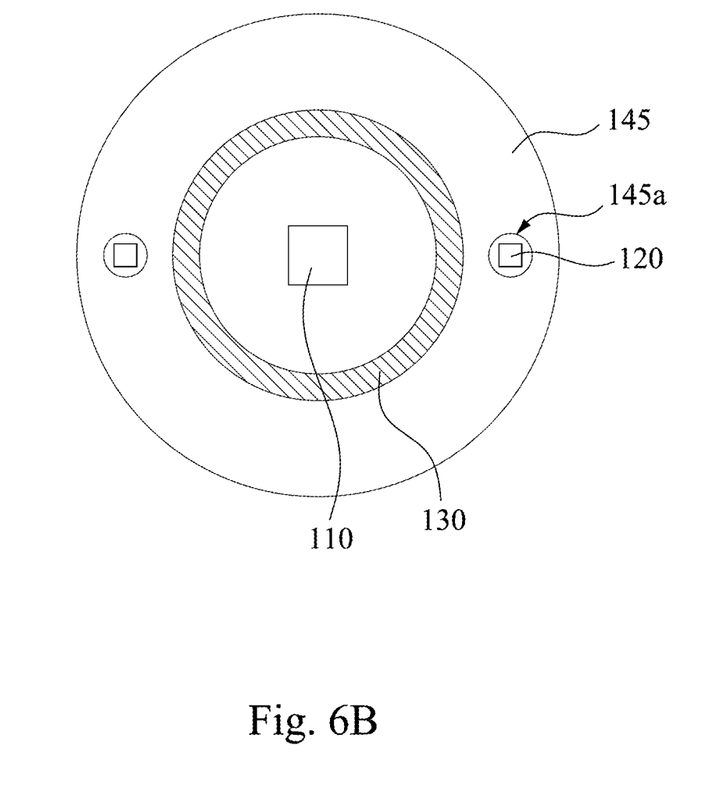
FIG. 6B is a plane view schematically showing the image sensing device, the light shielding structure, the light source and the field angle controller of FIG. 6A, according to some embodiments of the present disclosure.

FIG. 6B is a plane view schematically showing the image sensing device 110, the light shielding structure 130, the light source 120 and the field angle controller 140 of FIG. 6A, according to some embodiments. As shown in FIG. 6A and FIG. 6B, the top plate 145 of the field angle controller 140 is physically connected to the light shielding structure 130. For instance, the top plate 145 laterally extends from the top of the light shielding structure 130 to a position past the light source 120. The top plate 145 may be extended in a direction substantially perpendicular to the light shielding structure 130 and/or the axis C of the field angle θ. The top plate 145 may have a plurality of apertures 145a, and each of the apertures 145a exposes partial or entire light emitting plane 122 of the light source 120. The top plate 145 shields the light with a large angle with respect to the axis C, and therefore the SNR of the detected fingerprint may be enhanced.

Figure 7A:
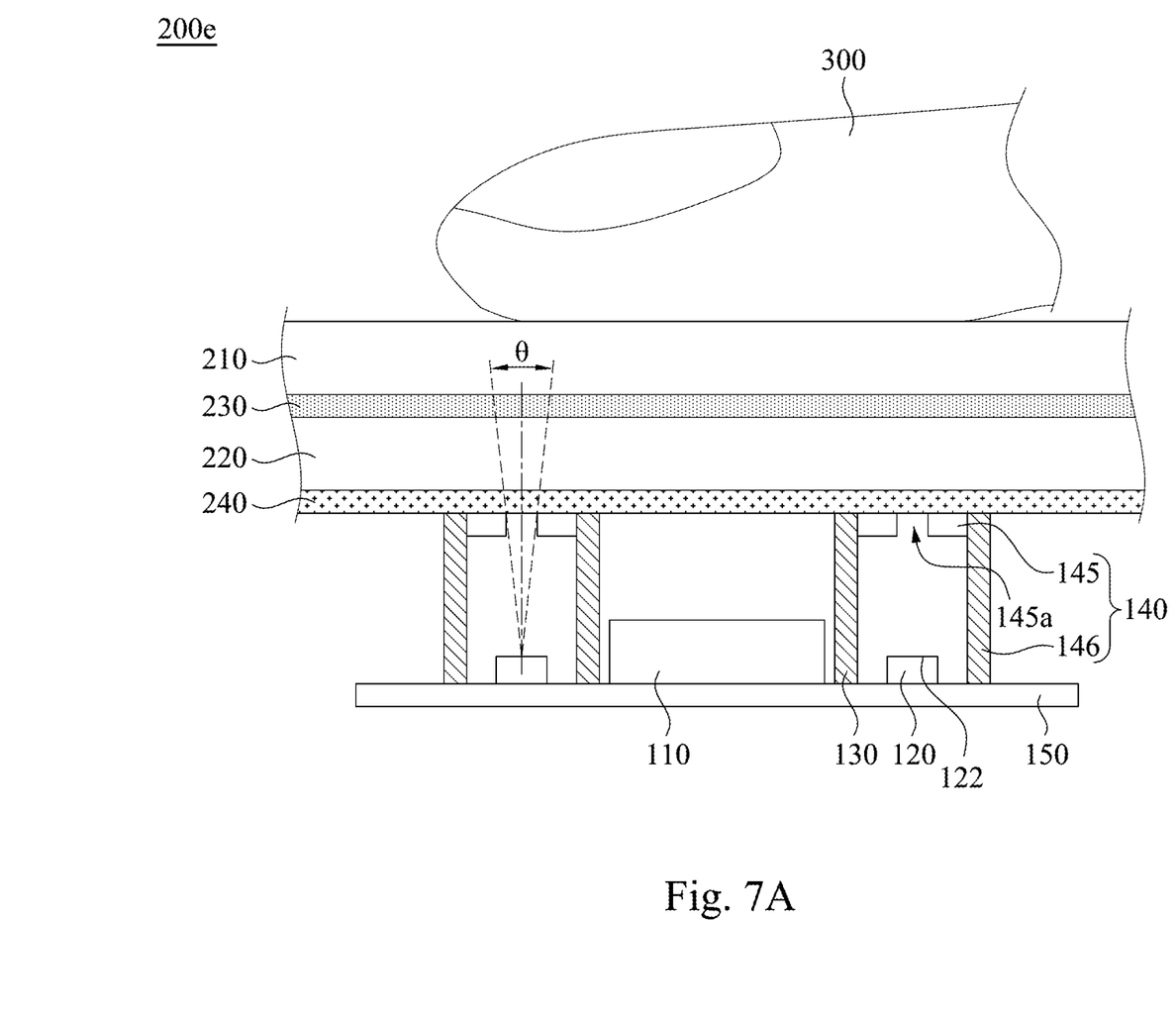
FIG. 7A is a cross-sectional view schematically illustrating a display device with optical fingerprint detection, according to yet some embodiments of the present disclosure.
Figure 7B:
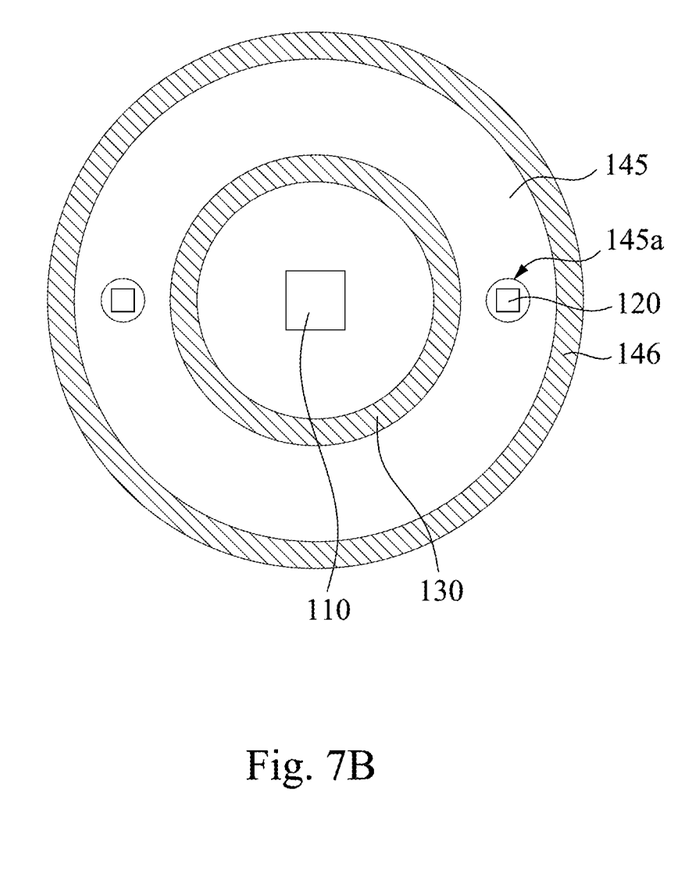
FIG. 7B is a plane view schematically showing the image sensing device, the light shielding structure, the light source and the field angle controller of FIG. 7A, according to some embodiments of the present disclosure.

FIG. 7A is a cross-sectional view schematically illustrating a display device 200e with optical fingerprint detection, according to yet some embodiments of the present disclosure. FIG. 7B is a plane view schematically showing the image sensing device 110, the light shielding structure 130, the light source 120 and the field angle controller 140 of FIG. 7A. The display device 200e is similar to the display device 200d shown in FIG. 6A, except that the field angle controller 140 further includes a wall 146 extending downwards from the top plate 145. In some embodiments, the wall 146 extends downwards to a position below the light emitting plane 122. In some examples, the wall 146 may extend from the top plate 145 to the substrate 150, and therefore the wall 146 has a height substantially equal to a height of the light shielding structure 130. Moreover, the bottoms of both the wall 146 and the light shielding structure 130 may be firmly fixed onto the substrate 150, and therefore the stability and accuracy of the construction of the light shielding structure 130 and the field angle controller 140 are secured. In other words, the accuracy and reliability of the entire optical fingerprint sensing module are improved. For example, the light shielding structure 130, and the top plate 145 and the wall 146 of the field angle controller 140 may be integrated into a single piece. Specifically, a molding process may be used to form an integrated piece comprised of the light shielding structure 130 and field angle controller 140.

In yet some embodiments, the wall 146 surrounds the light shielding structure 130 which surrounds the image sensing device 110. Particularly, the light source 120 is positioned between the wall 146 and the light shielding structure 130. More particularly, the light source 120 is enveloped in the space defined by the light shielding structure 130, the substrate 150, and the top plate 145 and the wall 146 of the field angle controller 140. Only the aperture 145a provides a light path for the light emitted from the light source 120. As a result, the SNR of the detected fingerprint and the reliability of the optical fingerprint sensing module are improved.

Figure 8:
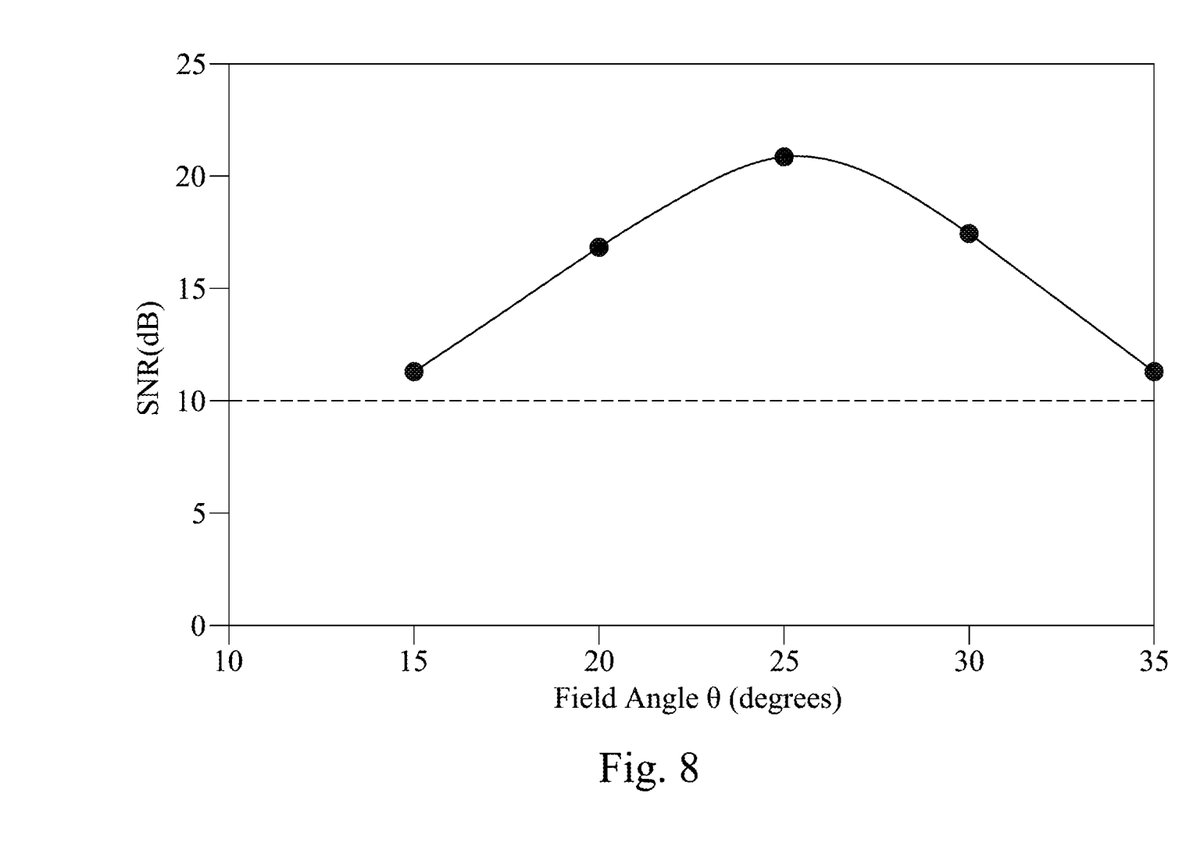
FIG. 8 is diagram showing the relationship between the SNR of the detected fingerprint and the field angle θ according to some examples of the present disclosure.

FIG. 8 is diagram showing the relationship between the SNR of the detected fingerprint and the field angle θ of light projected to the finger of a user according to some examples of the present disclosure. It is unexpected that the SNR of the detected fingerprint is considerably relevant to the field angle θ. For example, when the field angle θ is less than about 15 degrees, the SNR is less than or approximate to 10 (dB). On the other hand, when the field angle θ is greater than about 35 degrees, the SNR is less than or approximate to 10 (dB) as well. There exists a certain range of field angle θ that is capable of obtaining a relatively higher SNR of the detected fingerprint. The results associated with FIG. 8 are evidence showing the criticality of the field angle θ.

Figure 9:
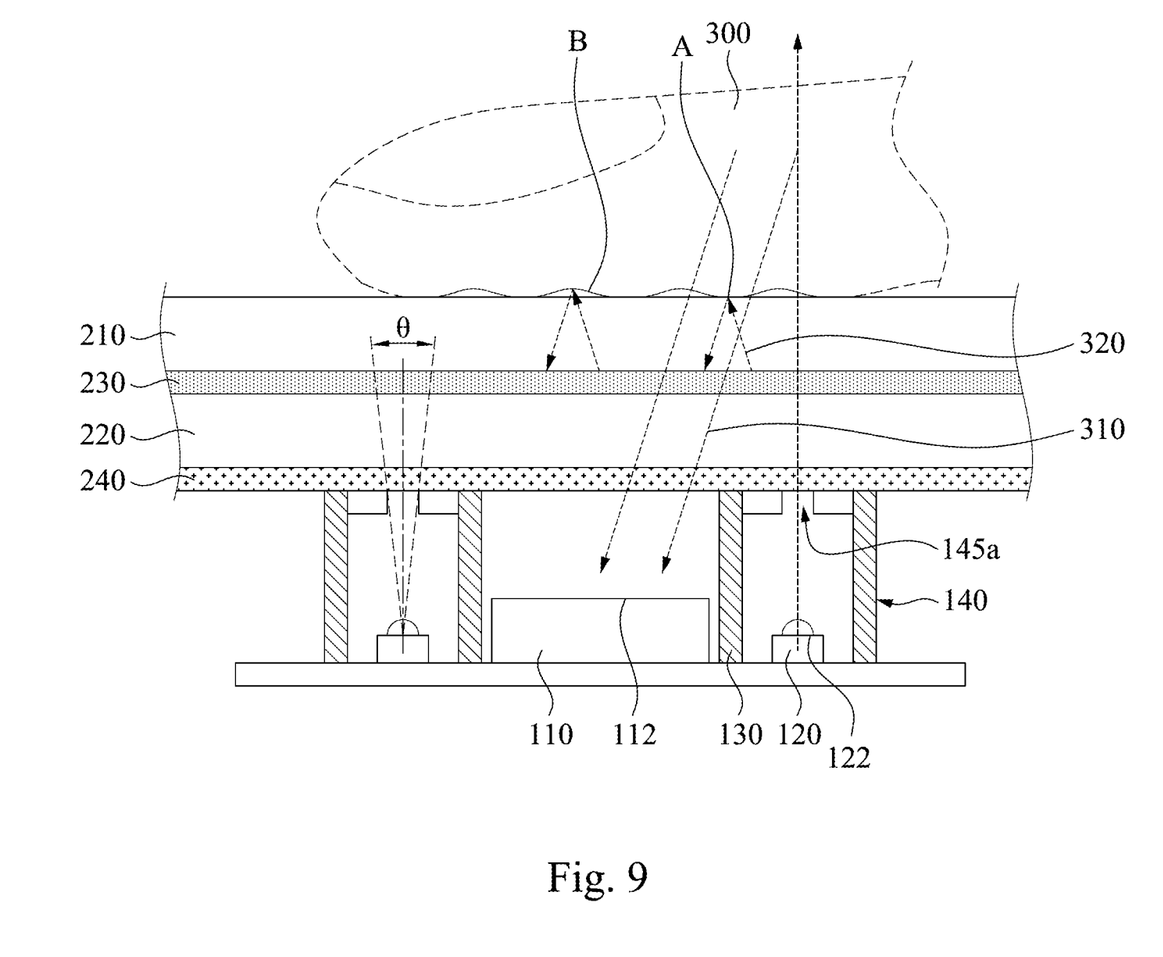
FIG. 9 is cross-sectional view schematically showing possible light paths in the display device of FIG. 7A.

FIG. 9 is cross-sectional view schematically showing possible light paths in the display device 200e of FIG. 7A, in which the fingerprint of the finger 300 is enlarged for better illustration. As shown, the fingerprint has a number of protrusive portions A and a number of recessed portions B. The light emitted from the light source 120 transmits through the aperture 145a of the field angle controller 140, and projects to the finger 300. The light further transmits into the finger 300 and is scattered (and/or reflected) by the tissue in the finger 300. The scattered light transmits along the light path 310 to the light sensing plane 112 through the fingerprint of the finger 300, and therefore the fingerprint is detected by the light sensing plane 112. If the fingerprint is detected in the optical mechanism described above, the protrusive portions A of the finger 300 are detected as "dark" patterns whereas the recessed portions B are detected as "bright" patterns. That is because the light passing through the protrusive portions A has a longer light path in the tissue of the finger 300, and the tissue absorbs parts of the light and decreases the light intensity.

Figure 10:
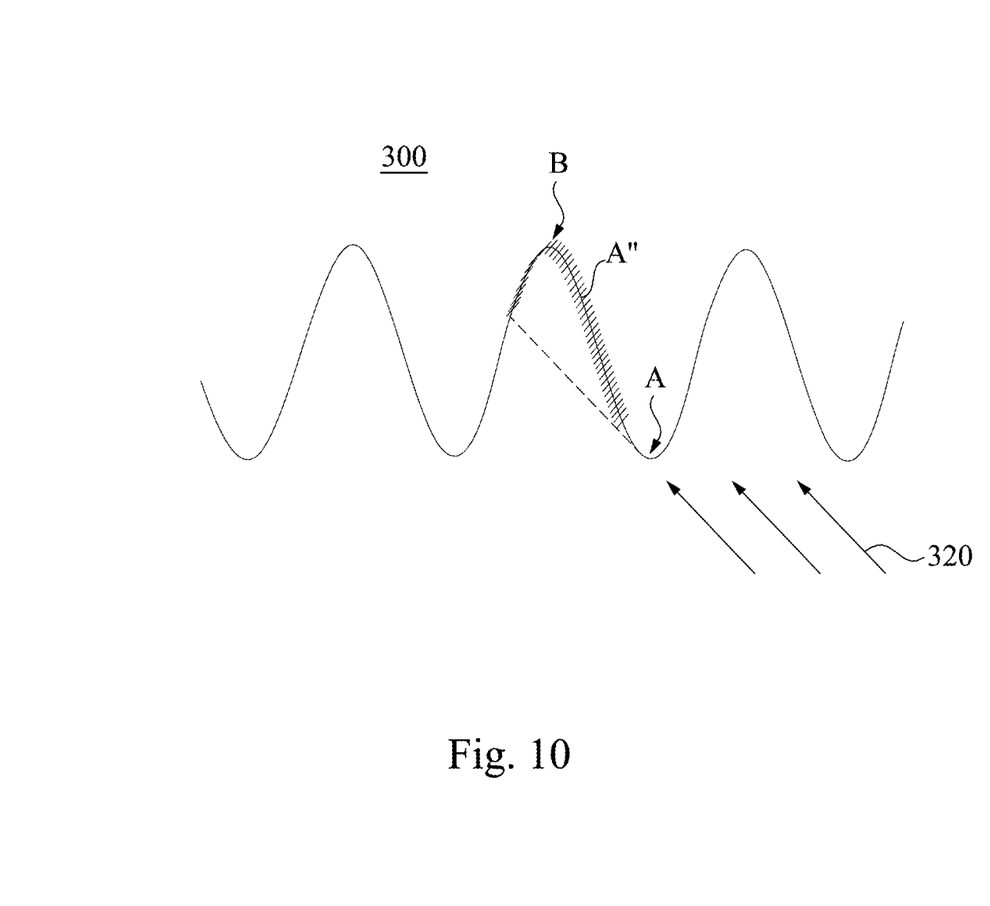
FIG. 10 is an enlarged cross-sectional view to illustrate certain possible mechanism.

However, there is another light path present in the display device 200e, i.e., light reflection. As the light with a large incident angle transmits along the light path 320 to the surface of the fingerprint, the light is reflected and directed to the light sensing plane 112. While this light path occurs, the protrusive portions A are detected as "bright" patterns whereas the recessed portions B are detected as "dark" patterns, and these patterns are just in contrast to that of light path 310 described in the previous paragraph. FIG. 10 is an enlarged cross-sectional view to illustrate the possible mechanism. As the light with a large incident angle illuminates the protrusive portions A along the light path 320, shadows A" of the protrusive portions A is generated covering the recessed portions B. Therefore, the protrusive portions A of the finger 300 are detected as "bright" patterns, but the recessed portions B are detected as "dark" patterns. The detected pattern associated with the light path 320 is contrary to that associated with the light path 310. Accordingly, the light path 320 derived from light with large incident angles may interfere with the detected patterns associated with the light path 310. When the field angle θ of the light projected to the finger is increased, the amount of the light with large incident angles increases, leading to an increase in the reflection of the light path 320. Accordingly, when the field angle θ is greater than a certain level, the SNR of the detected fingerprint is decreased.

Moreover, the field angle θ also affects the light path 310. Referring back to FIG. 9, when the field angle θ is narrowed, the amount of the scattered light transmitted along the light path 310 possibly decreases. A wider field angle θ possibly enhances the multi-directionality of the light scattering because a wider field angle θ provides more incident directions. Therefore, a narrowed field angle θ possibly suppresses the multi-directionality of the light scattering, leading to the decrease in the amount of scattered light transmitted along the light path 310. Accordingly, when the field angle θ is less than a certain level, the SNR of the detected fingerprint is also decreased.

Referring back to FIG. 3, the distance D also affects the light path 310 and the light path 320, and therefore a relative better range of the distance D is also present in terms of the SNR of the detected fingerprint.

Nevertheless, the present application is not intended to be bound to any theory or optical mechanism. The relevant theory and mechanism described in the present disclosure is only for the purpose of better understanding of the criticality of the field angle θ and the distance D.

The foregoing has outlined features of several embodiments so that those skilled in the art may better understand the detailed description above. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An optical fingerprint sensing module, comprising:
   an image sensing device configured to sense light transmitted from a fingerprint on a display panel and comprising a light sensing plane having a first geometric center;
   at least one light source adjacent to the image sensing device, wherein the light source comprises a light emitting plane having a second geometric center, and the first geometric center is separated from the second geometric center by a distance ranged from 2 mm to 20 mm;
   a light shielding structure disposed between the image sensing device and the light source; and
   a field angle controller cooperated with the light source such that light emitted from the light source or passing through the field angle controller has a field angle ranged from 5 degrees to 60 degrees, wherein the field angle controller comprises a top plate extending laterally from a top of the light shielding structure and a wall extending downwards from the top plate, the top plate has an aperture aligned with the light emitting plane and disposed above the light source, a width of the aperture is smaller than a width of the light emitting plane of the light source, the light source is positioned between the wall and the light shielding structure, and the wall surrounds the light shielding structure and the light source.

2. The optical fingerprint sensing module according to claim 1, wherein the field angle ranges from 15 degrees to 35 degrees.

3. The optical fingerprint sensing module according to claim 1, wherein the field angle ranges from 20 degrees to 30 degrees.

4. The optical fingerprint sensing module according to claim 1, wherein the field angle has an axis that is substantially perpendicular to the light sensing plane.

5. The optical fingerprint sensing module according to claim 1, wherein the distance ranges from 4 mm to 10 mm.

6. The optical fingerprint sensing module according to claim 1, wherein the image sensing device has a bottom that is coplanar with a bottom of the light source.

7. The optical fingerprint sensing module according to claim 1, wherein the light shielding structure surrounds the image sensing device.

8. The optical fingerprint sensing module according to claim 1, wherein the light shielding structure has an opening exposing the image sensing device.

9. A display device with optical fingerprint detection, comprising:
   a display panel having a display side and a backside opposite to the display side; and
   the optical fingerprint sensing module according to claim 1 disposed at the backside of the display panel.

10. The display device according to claim 9, wherein the light emitting plane and the light sensing plane face the backside of the display panel.

11. An optical fingerprint sensing module, comprising:
    an image sensing device;
    a light shielding structure surrounding the image sensing device, wherein the light shielding structure has an opening exposing the image sensing device;
    at least one light source positioned out of the light shielding structure such that the light shielding structure is located between the light source and the image sensing device; and
    a field angle controller adjacent to the light source and cooperated with the light source such that light emitted from the light source or passing through the field angle controller has a field angle ranged from 5 degrees to 60 degrees, wherein the field angle controller comprises a top plate extending laterally from a top of the light shielding structure and a wall extending downwards from the top plate, the top plate has an aperture aligned with the light emitting plane in a direction perpendicular to the light emitting plane and disposed above the light source, a width of the aperture is smaller than a width of a light emitting plane of the light source, the light source is positioned between the wall and the light shielding structure, and the wall surrounds the light shielding structure and the light source.

12. The optical fingerprint sensing module according to claim 11, wherein
    the image sensing device comprises a light sensing plane having a first geometric center, and
    the light source comprises the light emitting plane having a second geometric center,
    wherein the first geometric center is separated from the second geometric center by a distance ranged from 2 mm to 20 mm.

13. The optical fingerprint sensing module according to claim 11, wherein the field angle ranges from 15 degrees to 35 degrees.

* * * * *